Patented May 16, 1933

1,909,786

UNITED STATES PATENT OFFICE

OSKAR PANTKE, OF COLLEGE POINT, NEW YORK, ASSIGNOR, BY MESNE ASSIGNMENTS, TO CATALIN CORPORATION OF AMERICA, OF FORDS, NEW JERSEY, A CORPORATION OF DELAWARE

LOW TEMPERATURE PHENOL-FORMALDEHYDE RESINS AND PROCESS OF MAKING SAME

No Drawing.   Application filed August 28, 1930.   Serial No. 478,543.

The present invention relates to low temperature synthetic resins and more particularly to synthetic resins condensed in the presence of a fixed alkaline catalyst and at a relatively low temperature.

It is an object of the present invention to provide a synthetic resin constituted of a phenol-formaldehyde condensation product of such a character that the finished product has improved physical and chemical properties.

It is a further object of the invention to provide a synthetic resin which is relatively elastic, which is strong and which is relatively inert to various agents and influences.

A further object of the invention is to provide a synthetic resin of the phenol-formaldehyde type having a light color.

A further object of the invention is to provide a synthetic resin which is capable of being worked readily and easily and which can be subjected to all of the various machining operations including turning, drilling, sawing, polishing, grinding and which can be readily fabricated into articles of commerce and industry.

It is also within the contemplation of the present invention to provide an improved process for producing the synthetic resin of a character described hereinabove on a commercial and industrial scale, in an economical and practical manner.

The invention also provides a process of producing a synthetic resin of the character set forth hereinabove by the use of reagents having high catalytic action and effecting condensation of the resin at a relatively low temperature.

Other objects and advantages of the invention will become apparent from the following description.

Broadly stated, my invention contemplates reacting phenol-formaldehyde in such amounts and in the presence of catalysts of high activity such as caustic soda and under the influence of low heat at a temperature below the boiling point of water at atmospheric pressure. The process involves the addition of a substance having the dual function of a neutralizer and clarifier to the reaction mass of phenol and formaldehyde. The addition of a substance of this character not only neutralizes the free alkali in the phenol-formaldehyde reacting mass, but also clarifies the body of resin as a whole. After the addition of the aforesaid substance, the resinous mass is subjected to the further application of low heat in the presence of a vacuum. After the neutralization of the alkali, such as caustic soda, a dehydrater and plasticizer is added to the mass of resin under treatment. In practice it is preferred to add one substance having the properties both of a dehydrater and plasticizer. After the addition of the aforesaid substance the entire resinous mass is subjected to the combined action of a vacuum and a low heat treatment with a temperature lower than the boiling point of water for a period sufficient to effect the removal of practically all of the water contained in the resinous mass.

When practically all of the water is removed, the resinous mass is in a condition ready for casting or pouring in open molds. The casting operation is effected in any appropriate manner as, for example, casting or pouring into open molds. After pouring, the cast resin is placed in vulcanizers and the resin is cured by the application of low heat at a temperature below the boiling point of water at atmospheric pressure. The application of said low heat is continued until the resin sets or hardens or polymerizes to form a solid, hard mass. Upon hardening and setting of the resin the latter may be removed from the molds in any suitable manner and the resin is then in a condition ready for use in the fabrication and manufacture of various articles of commerce and industry.

For a better understanding of the invention, the following specific examples are given solely for purposes of illustration.

It is to be observed that although certain specific substances, temperatures, concentrations, pressures and the like are given, the invention is not to be limited thereto but is to be construed in the light and spirit of the appended claims.

Example 1

Phenol and formaldehyde are preferably first mixed together in the proportion of about 1 part of U. S. P. phenol and about 2½ parts of 30% U. S. P. aqueous formaldehyde solution. The foregoing parts as well as the following are parts by weight as those skilled in the art will readily understand. To this mixture is preferably added a 20% aqueous solution of caustic soda corresponding to about 0.03 parts of c.p. caustic soda (sodium hydroxide). After the introduction of the caustic to the mixture of phenol-formaldehyde the entire mass is heated for a period of about 2½ hours at relatively low heat, preferably at a temperature lying within a range of about 60° C. to about 75° C. or 80° C. for about 2 to 3½ or 4 hours. At the termination of the aforesaid heating period a vacuum is applied preferably of high character of about 730 mm. of mercury. The application of the vacuum has a tendency to withdraw or suck off the water in the reacting mass and the evaporation of water causes the temperature of the mass to fall to about 35° C. to about 40° C. This fall in temperature is compensated by the application of heat, preferably indirect steam heat to the reacting mass. As the removal of water or dehydration of the resinous mass proceeds, the temperature of the resinous mass continues to increase. When the temperature has risen or increased from about 35° C. to about 64° C., a substance capable of effecting neutralization and clarification of the resinous mass is added. In practice, I prefer to use lactic acid or its isomers or its equivalents. To the mass mentioned hereinabove, I preferably add about 0.06 to about 0.075 parts of c.p. lactic acid which is sufficient to neutralize practically all of the alkali present.

When the neutralization of the alkali has been substantially completed, a substance having dehydrating and plasticizing properties, is added. In practice white distilled glycerine or c. p. glycerine is employed. For the aforesaid proportions of reacting material I add about 0.15 parts to about 0.20 parts of 98% glycerine. When the glycerine has been added, high vacuum and low heat are preferably continued until the resin is substantially dehydrated. In practice, the most convenient test to apply to the resin to ascertain if the latter is dehydrated is to take a sample of the resin and drop it in a beaker of cold water having a temperature of about 11 to 13° C. If the mass of resin which has been added to the beaker of water congeals and solidifies and has just sufficient hardness to yield slightly when squeezed between the fingers, in its congealed state then the dehydration is substantially completed.

After the resin has been practically dehydrated, it can then be poured or cast in a liquid condition into open molds. The molds containing the resin are then placed in vulcanizers which are maintained under a relatively low heat at a temperature below the boiling point of water. The application of the relatively low heat is continued until the resin completes its polymerization and sets to a hardened, stable solid. Generally a period of about 100 to about 200 hours is sufficient to effect curing or hardening of the resin described hereinabove at about 78° to 82° C., i. e. at a temperature below about 82° C.

A resin produced in accordance with the improved process has the following properties:

| | | | |
|---|---|---|---|
| Specific gravity | 1.270 | to 1.350 | (approximately) |
| Ash | 0.25% | to 0.50% | (approximately) |
| Yield point | 4500 | to 7000 | lbs. per sq. inch (approx.) |
| Tensile strength | 6500 | to 9500 | lbs. per sq. inch (approx.) |
| Compression strength | 10000 | to 16000 | lbs. per sq. inch (approx.) |
| Rockwell hardness | B-64 | to B-66 | (approximately) |

The specific gravity of the resin may be varied as those skilled in the art will readily understand. For example, the greater the water content, the lower the specific gravity and conversely, the lower the water content, the higher the specific gravity. By varying the water content, resins may be produced having a lower and a higher specific gravity than the figures set forth hereinabove. Then again, the amount of glycerine present in the resin changes the specific gravity thereof. Furthermore, by varying the degree of heat used in the vulcanization the specific gravity of the resin may likewise be varied. For instance, resin may be produced having a specific gravity as low as approximately 1.25 and as high as approximately 1.38.

The ash content of the resin is preferably maintained as low as possible and is usually dependent upon the purity of the chemicals employed.

The strength of the resin may be varied within relatively wide limits. Generally speaking, by over-vulcanizing or under-vulcanizing the strength is lowered and by vulcanizing carefully the strength may be increased. By taking care to have the resin free from imperfections, air bubbles and blow holes, a stronger resin may be produced. Furthermore, the more solids including dyestuffs, fillers and the like incorporated in the resin tends to decrease the strength of the resin.

The hardness of the resin may be varied by the curing or vulcanizing operation and/or the extent to which the resin has polymerized. It may be broadly stated that the more complete the polymerization or vulcanization, the harder the resin. Moreover, the glycerine content influences hardness and, usually, the less glycerine the harder the resin.

The resin is fire retardant and relatively inert to certain substances. In addition, the resin is practically impervious to oils, is practically odorless and tasteless and has a relatively high dielectric strength. In addition, the substance is relatively elastic and is substantially non-brittle. These features make it possible to work and machine and fabricate the synthetic resin with relatively great facility. For instance, the resin may be sawed with a band saw, hack saw, jig saw, circular saw or with abrasive discs. There is relatively no tendency of the saw to run and it can be easily guided along lines with accuracy. In practice, steel saws soft enough to file should be used. The resin can be turned or formed to any shape or automatic screw machines, lathes or milling machines. In general, it may be said that the material can be treated similarly to brass and that the lathe speeds and the like can vary from approximately 200 to 350 surface feet per minute. It is possible to drill the resin with straight fluted drills or slow twist drills. The synthetic resin may also be threaded with conventional taps and dies and can be engraved or carved in the same manner as wood, bone or the like. It is also possible to sand the resin with practically the same equipment used for wood. In polishing the resin a regular buffer of about 12 inches in diameter and running at a speed of 1800 R. P. M. is used. Tripoli polishing wax may be used as the polishing medium for producing a relatively high finish on the finished article. For completing the polishing operation it is usually advisable to subject the article to the action of a soft dry buff to put a final polish thereon. When small articles are treated they can be polished in a barrel revolving at about 50 R. P. M. generally made of wood and preferably lined with heavy felt.

*Example 2*

In this case about 1 part of U. S. P. phenol and about 2 parts U. S. P. 40% aqueous formaldehyde solution is mixed together. To this mixture are added about 0.0345 parts of potash (potassium hydroxide) and the mass is heated to about 65° for about 2½ hours. After the above operation is completed, a substantially complete vacuum and low heat are applied to the resin mass until the latter is partially dehydrated. During the dehydration process the temperature falls and then rises again. When the temperature of the resin comes back to about 65° centigrade, about 0.0675-0.075 parts of c.p. lactic acid are added to neutralize substantially all of the caustic present. The application of vacuum and low heat to the mixture is continued.

After the alkali is neutralized by the lactic acid about 0.15 parts of c.p. 98% glycerine are added. The aforesaid vacuum and low heat are continued until the entire mass is substantially dehydrated. The same test for dehydration described hereinabove is used.

When dehydration has been effected the resinous mass is cast or poured as a fluid or liquid into open molds. After the casting operation, the resin is vulcanized as described hereinabove.

*Example 3*

About 1 part of phenol is melted in a suitable vessel. To the melted phenol about 0.8 parts of paraformaldehyde are added to form a thin paste. To the thin paste about 0.030 parts of caustic soda or 0.0345 parts of potash (potassium hydroxide) are added in the form of a 20% aqueous solution. The temperature of the mass is raised to about 65° C. and maintained at this temperature for about two to about two and one-half hours. After the above operation is completed, a substantially complete vacuum and low heat are applied to the mass until the latter is partially dehydrated. During the dehydration process the temperature falls and then rises again. When the temperature comes back to about 65° C. about 0.0675 parts of c.p. lactic acid are employed. The vacuum and low heat are continued and after the expiration of about one half hour about 0.150 parts of 98% glycerine are added. The low heat and vacuum are continued until the resin is practically completely dehydrated. The test described in Example 1 can be used for this case as well. When the resin is dehydrated it is ready to be cast or poured into open molds and then to be vulcanized as described in connection with Example 1.

*Example 4*

About 0.44 parts of U. S. P. phenol is mixed in a kettle with about 0.88 parts of U. S. P. 40% aqueous formaldehyde solution. To this mixture about 0.063 to about 0.067 parts of about 20% c.p. caustic soda solution are added and the mass is heated to about 65° C. for about 2½ hours. A high vacuum and a low heat are applied to the mixture as described in Example No. 1. At the termination of the foregoing heating period, about 0.060 parts to about 0.065 parts of about 50% lactic acid solution are added.

After the caustic soda is neutralized by the lactic acid, about 0.16 parts c.p. 98% glycerine are added. The vacuum and heat are continued until the entire mass is substantially dehydrated as described hereinabove. The same test for dehydration which was described in connection with Example 1 is used for this example as well.

When dehydration has been effected the colorless liquid is cast or poured as a fluid or liquid into open molds in which the liquid resin is vulcanized or hardened as described hereinbefore.

In the foregoing examples whether 30% or

40% aqueous formaldehyde or whether paraformaldehyde is used the ratio of phenol to formaldehyde is about 1.25 parts of the former to about 1.00 parts of the latter.

In all of the examples the vulcanization or hardening process is practically the same. The poured or cast resin is heated at a low heat below the boiling point of water, preferably at a temperature of about 76° C. to about 82° C., for a period sufficient to harden or vulcanize the resin. Usually this period varies from about 100 hours to about 200 hours. The higher the temperature above 82° C. but below 100° C. the shorter the time to vulcanize the resin. With higher temperatures the resin tends to darken somewhat.

The colorless resin when in its liquid state can be colored in practically all tints and shades and can be made to resemble precious and semi-precious stones, minerals and natural products. For example, a resin can be made which will simulate onyx. In making a green onyx, dye stuffs known in the trade as tropacoline G or zapongreen G pulver or mixtures thereof can be employed. In making a brown onyx, a mixture of dye stuffs known in the trade as lithol red, zapongreen G and heliochromegelb can be employed. Then again, if its is desired to make a resin simulating rose quartz a dye stuff known in the trade as authol brilliant B N D may be employed. For the production of a resin resembling green quartz a mixture of dye stuffs known in the trade as neptune blue B G X and aurimine base can be employed. For the production of a resin simulating a cloudy amber a dye stuff known in the trade as heliochromegelb is added to the resin in its liquid state. In manufacturing a resin closely resembling natural jade a mixture of dye stuffs known in the trade as neptune blue B G X and aurimine base can be employed. Similarly, various other natural products can be simulated by incorporating the proper coloring agent in the resin in its liquid state as one skilled in the art will readily understand.

In some instances it is desirable to employ the liquid resin by itself. For instance in the impregnation or surfacing of materials or the like in a well known manner, the resin is to be finished as described hereinabove except that the liquid resin is poured into receptacles or containers instead of molds. For other uses of the liquid synthetic resin, however, the application of low heat and vacuum is only continued until the desired amount of water has been removed and/or the resin has attained the desired consistency. Generally speaking, the time varies from about ½ hour to about 1½ hours or so. In any case my low temperature liquid phenol-formaldehyde resin has a pH value of about 6.00 (as determined by the Leeds and Northrup potentiometer method).

It will be noted that the present invention provides a low temperature process for the production of synthetic resins of the phenol-formaldehyde condensation type at relatively low temperatures. By low temperatures is means temperatures lower than 100° C. which is in sharp contrast to prior processes which must be conducted at or above the boiling point of water or 100° C. at atmospheric pressure. In other words, the present process is conducted without boiling and under non-reflux conditions and is carried out at temperatures substantially below 100° C. as noted hereinbefore. Generally speaking, the lower the temperature employed in the present process the longer the time it takes to produce the resin. For instance, if a temperature of about 50° C. were employed then a longer time would be necessary to heat the mass than has been described in connection with the temperatures given. If a higher temperature is used than the one specified, the heating period would be shortened but the resin would have a tendency to become darkened. By the present process a resin is produced which has an extremely light color and which can be tinted with various coloring agents to produce a material which closely resembles or simulates precious and semi-precious stones and minerals.

It will be also observed that my invention provides an improved phenol-formaldehyde resin of the artistic, colorful and beautiful type which is capable of easy fabrication. For instance, a rod of the present resin can be turned on a lathe and the cut material is turned off in the form of a long ribbon quite similar to a wood shaving. Prior resins do not generally have this property and tend to cut off in small chips or pieces when turned on a lathe. The instant characteristic is very useful in identifying the improved resin set forth herein. When shavings of the present resin are heated at 99° C. in an electric oven for a period of time sufficient to bring them to constant weight, say about 20 hours, there is a practically constant loss which varies from about 8 to about 10% of the weight of the resin. Another good test for identifying the present resin is to subject a rod of the resin to an impact blow, as for instance, when a rod of resin is grasped in the hand and the free end of the rod is struck against a fixed object. With resins of the present type, they will absorb considerable shock whereas other resins of the same class will tend to break and fracture. Then again if a rod of the instant resin is dropped on either a concrete or hard floor it will bounce back without breaking. Other known resins are rather dead and do not bounce very much and generally have a tendency to crack when dropped. Furthermore, a small rod constituted of the present resin say ½″ in diameter, when immersed in hot water can be bent quite readily without breaking. Other resins are less flexible and will tend to break when subjected to this test.

It is further to be noted that the present process produces a resin which is tougher and stronger than known resins. For instance, the present resin generally has a higher tensile strength and elasticity than similar resins. In addition, the instant resin is less brittle than prior resins. In fact, my resin is relatively non-brittle as compared with the old resins, particularly in working, and in the claims the phrase "relatively non-brittle" will be used to characterize this distinguishing feature of my resin.

Moreover, the present process produces a phenol-formaldehyde resin which when in its liquid state prior to hardening has a hydrogen ion content corresponding to a pH value of about 6.00 as determined by a potentiometer of the Leeds and Northrup type. Prior resins have different pH values and the aforesaid pH value for liquid resin made in accordance with the process described herein is another good way of identfying the present improved resin.

It is to be observed that the present invention provides a process for producing a low temperature phenol-formaldehyde synthetic resin made by reacting phenol and formaldehyde in the proportion of about 1 part by weight of the former to about 0.8 parts by weight of the latter. The amount of formaldehyde used depends upon the final product and the form of raw material. In other words, where formaldehyde is used in the form of a solution, about 2.5 parts of about a 30% aqueous formaldehyde solution are used or about 2 parts of about a 40% solution are used. The phenol-formaldehyde mass contains a fixed alkali catalyst which is present to an extent of about 0.03 to about 0.0345 parts by weight. Of course, when the fixed alkali catalyst, such as caustic soda or caustic potash, is used in the form of a solution an increased amount of solution will have to be used depending upon the dilution or concentration of the solution as those skilled in the art will readily understand. Subsequently, the fixed alkali catalyst is completely neutralized by the addition of about 0.06 to about 0.075 parts by weight of lactic acid. If the acid is used in the form of an aqueous solution, the amount of solution must be increased depending upon the dilution or concentration of the solution. During the process or prior to final heating, about 0.15 to about 0.20 parts by weight of glycerine are added. Variation and modification of the specific proportions herein given are within the purview of the present specification and claims as those skilled in the art will understand.

Although I have set forth herein specific temperatures, concentrations, period of time, specific substances and specific operation, it will be observed that the use of equivalents and variations may be resorted to without departing from the spirit of the invention as defined in the appended claims.

I claim:—

1. The process of producing a low temperature phenol-formaldehyde resin which comprises reacting about 1.25 parts by weight of phenol with aqueous formaldehyde containing about 1.00 part by weight of formaldehyde in the presence of about 0.030 parts by weight of c.p. fixed alkali hydroxide, heating said mass without boiling the same at a temperature of about 60° C. to about 80° C. for a period of about 2 to about 4 hours under non-reflux conditions to form a resinous mass, upon the termination of the said period applying a vacuum to effect the evaporation of water, the temperature of the mass tending to fall to a temperature of about 35° C. to about 40° C., continuing the application of heat to raise the temperature of said mass to a temperature of about 60° C. to about 80° C., adding about 0.06 parts to about 0.075 parts by weight of lactic acid to substantially neutralize said alkali catalyst, continuing the application of said low heat and vacuum, subsequent to the neutralization of said alkali catalyst adding c.p. water-white glycerine in proportion of about 0.15 parts to about 0.2 parts by weight, continuing the application of said vacuum and heat to effect dehydration of the resinous mass, discontinuing the aforesaid operation when a sample of the resinous mass, upon being dropped in water having a temperature of about 11° C. to about 13° C., congeals to a globule having just sufficient hardness to yield slightly when squeezed between the fingers, then pouring the resinous mass into molds and subjecting said molds to heat at a temperature of about 82° C. or below for a period up to about 200 hours to harden and solidify the said resinous mass.

2. The process of producing a low temperature phenol-formaldehyde resin which comprises reacting a mass of phenol and a substance yielding formaldehyde in the proportion of about 1.25 parts by weight of phenol to about 1.00 part by weight of formaldehyde in the presence of about 0.030 parts by weight of a c.p. fixed alkali catalyst, heating the said mass without boiling the same at a low heat substantially below the boiling point of water for a period of about 2 to about 4 hours under non-refluxing conditions, applying a vacuum to said mass after the termination of said period whereby water is evaporated and the temperature of said mass tends to fall, continuing the application of heat to maintain the temperature of said mass, adding c.p. lactic acid to substantially neutralize said alkali catalyst, continuing the application of said low heat and vacuum, subsequent to the neutralization of the alkali catalyst adding c.p. glycerine in the proportion of about 0.15 to about 0.2 parts by weight, continuing the application of said vacuum and heat to effect dehydration of said mass, discontinuing said operation when a sample of the resinous mass upon being dropped into cold water congeals to a globule having just sufficient hardness to yield slightly when squeezed between the fingers, then pouring the resinous mass into molds, and subjecting said molds to heat at a temperature of about 60° C. to about 82° C. or below for a period up to 200 hours to harden said resinous mass.

3. The process of producing a low temperature phenol-formaldehyde resin which comprises reacting a mass of phenol and a substance yielding formaldehyde in the proportion of about 1.25 parts by weights of phenol to about 1.0 part by weight of formaldehyde in the presence of a fixed alkali catalyst, heating the said phenol-formaldehyde mass containing the fixed alkali catalyst without boiling the same at low heat substantially under 100° C. for a period of about 2 to about 4 hours under atmospheric pressure and non-reflux conditions, applying a vacuum to the said mass after the termination of said period, whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said low heat and vacuum, subsequent to the neutralization of the alkali catalyst adding glycerine in proportion of about 0.15 to about 0.2 parts by weight, continuing the application of said vacuum and heat to effect dehydration of said mass until a sample of the mass when dropped into cold water congeals to a globule having just sufficient hardness to yield slightly when squeezed between the fingers, thereafter pouring said mass into molds, and subjecting said molds to a low heat at a temperature substantially under about 100° C. for a period up to about 200 hours to harden said resinous mass.

4. The process of producing a low temperature phenol-formaldehyde resin which comprises reacting a mass of phenol and substance yielding formaldehyde in the presence of a fixed alkali catalyst, heating the said phenol-formaldehyde mass without boiling the same at low heat substantially under 100° C. for a period of about 2 to about 4 hours under non-reflux conditions, applying a vacuum to the said mass after the termination of said period, whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said low heat and vacuum, adding glycerine to the mass prior to final heating, continuing the application of said low heat and vacuum and pouring the liquid resin into molds.

5. The process of producing a low temperature phenol-formaldehyde resin which comprises reacting practically completely phenol and a substance yielding formaldehyde in the proportion of about 1.25 parts by weight of phenol to about 1.0 part by weight of formaldehyde in the presence of a fixed alkali catalyst, heating the said mass without boiling the same at a low heat substantially under 100° C. for a period of about 2 to about 4 hours, substantially neutralizing the fixed alkali catalyst with lactic acid, removing water from said mass by the application of said low heat and vacuum, adding glycerine subsequent to the neutralization of the mass, and continuing the application of said low heat substantially under 100° C. and said vacuum until a sample of the mass when dropped into cold water congeals to a globule having just sufficient hardness to yield slightly when squeezed between the fingers, thereupon pouring said mass into molds, and subjecting the mass in said molds to a low heat at a temperature substantially under about 100° C. for a period up to about 200 hours to harden said mass into a solid resin.

6. The process of producing a low temperature phenol-formaldehyde resin which comprises reacting about 0.44 parts by weight of U. S. P. phenol with about 0.88 parts by weight of U. S. P. aqueous formaldehyde of about 40% strength in the presence of about 0.063 to about 0.067 parts by weight of about a 20% c. p. caustic soda solution to form a resinous mass, heating said mass without boiling the same at a temperature of about 60° C. to about 80° C. for a period of about 2 to about 4 hours under non-reflux conditions, adding about 0.060 parts by weight to about 0.065 parts by weight of about 50% lactic acid solution, applying a vacuum and heat to effect the evaporation of water, the temperature of the mass tending to fall to a temperature of about 35° C. to about 40° C., adding about 0.06 part by weight c. p. 98% glycerine to said mass subsequent to neutralization, continuing the application of heat to raise the temperature of said mass to a temperature of about 60° C. to about 80° C. and until a sample of the resinous mass when dropped into cold water congeals to a globule having just sufficient hardness to yield slightly when squeezed between the fingers, thereafter pouring the mass into molds, and subjecting the resinous mass in said molds to a low heat of a temperature of about 60° C. to about 82° C. for a period up to about 200 hours to harden said resinous mass.

7. The process of producing a low temperature phenol-formaldehyde resin which comprises reacting practically completely phenol and formaldehyde in the presence of a fixed alkali catalyst, heating the said mass without boiling the same at a low heat at a temperature substantially below 100° C. for a period of about 2 hours to about 4 hours under non-reflux conditions to form a resinous mass, neutralizing the alkali catalyst with lactic acid, removing water from said mass by the application of said low heat and a vacuum, adding glycerine prior to the final application of said heat and vacuum, continuing the application of said heat and said vacuum until a sample of the mass when dropped into cold water congeals to a globule having just sufficient hardness to yield slightly when squeezed between the fingers, thereupon pouring said mass into molds, and subjecting the mass in said molds to said low heat for a period up to about 200 hours to harden said mass into a solid resin.

8. A solid low temperature phenol-formaldehyde synthetic resin made by reacting a mass of phenol and substance yielding formaldehyde in the proportion of about 1.25 parts by weight of phenol to about 1.0 part by weight of formaldehyde in the presence of a fixed alkali catalyst, heating the said phenol-formaldehyde mass containing the fixed alkali catalyst at low heat substantially under 100° C. for a period of about 2 to about 4 hours, applying a vacuum to the said mass after the termination of said period, whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said low heat and vacuum, adding glycerine in proportion of about 0.15 to about 0.2 parts by weight, continuing the application of said vacuum and heat to effect dehydration of said mass until a sample of the mass when dropped into cold water congeals to a globule having just sufficient hardness to yield slightly when squeezed between the fingers, thereafter pouring said mass into molds, and subjecting said molds to a low heat at a temperature substantially under about 100° C. for a period up to 200 hours to harden said resinous mass.

9. A solid low temperature phenol-formaldehyde synthetic resin made by reacting a mass of phenol and a substance yielding formaldehyde in the proportion of about 1.25 parts by weight of phenol to about 1.00 part by weight of formaldehyde in the presence of about 0.030 parts by weight of a c. p. fixed alkali catalyst, heating the said mass at a low heat substantially below the boiling point of water for a period of about 2 to about 4 hours, applying a vacuum to said mass after the termination of said period whereby water is evaporated and the temperature of said mass tends to fall, continuing the application of heat to maintain the temperature of said mass, adding c. p. lactic acid to neutralize said alkali catalyst, continuing the application of said low heat and vacuum, adding c. p. glycerine in the proportion of about 0.15 to about 0.2 parts by weight, continuing the application of said vacuum and heat to effect dehydration of said mass, discontinuing said operation when a sample of the resinous mass upon being dropped into cold water congeals to a globule having just sufficient hardness to yield slightly when squeezed between the fingers, then pouring the resinous mass into molds, and subjecting said molds to heat at a temperature of about 60° C. to 82° C. or below for a period up to 200 hours.

10. A solid low temperature phenol-formaldehyde synthetic resin made by reacting about 1.25 parts by weight of phenol with aqueous formaldehyde containing about 1.00 part by weight of formaldehyde in the presence of about 0.030 parts by weight of c. p. fixed alkali hydroxide to form a resinous mass, heating said mass at a temperature of about 60° C. to about 80° C. for a period of about 2 to about 4 hours, upon the termination of the said period applying a vacuum to effect the evaporation of water, the temperature of the mass tending to fall to a temperature of about 35° C. to about 40° C., continuing the application of heat to raise the temperature of said mass to a temperature of about 60° C. to about 80° C., adding about 0.06 parts to about 0.075 parts by weight of lactic acid to substantially neutralize said alkali catalyst, continuing the application of said low heat and vacuum, subsequent to the neutralization adding c. p. water white glycerine in proportion of about 0.15 parts to about 0.2 parts by weight, continuing the application of said vacuum and heat to effect dehydration of the resinous mass, discontinuing the aforesaid operation when a sample of the resinous mass, upon being dropped in water having a temperature of about 11° C. to about 13° C., congeals to a globule having just sufficient hardness to yield slightly when squeezed between the fingers, then pouring the resinous mass into molds, and subjecting said molds to heat at a temperature of about 82° C. or below for a period up to about 200 hours to harden and solidify the said resinous mass.

11. The process of producing a low temperature phenlo-formaldehyde resin which comprises reacting phenol with formaldehyde in the presence of a fixed alkali hydroxide to form a resinous mass, heating said mass without boiling the same at a temperature substantially under 100° C. under non-reflux conditions, applying a vacuum to assist in effecting the evaporation of water, the temperature of the mass tending to fall, continuing the application of heat to raise the temperature of said mass to a temperature substantially under 100° C., adding c. p. lactic acid to substantially neutralize said alkali catalyst, continuing the application of said heat substantially below 100° C. and said vacuum to effect dehydration of the resinous mass, adding glycerine to the mass during the aforesaid operations, then pouring the resinous mass into molds and subjecting said molds to heat at a temperature substantially below 100° C. to harden and solidify the said resinous mass.

12. The process of producing a low temperature phenol-formaldehyde resin which comprises reacting phenol and a substance yielding formaldehyde in the proportion of about 1.25 parts by weight of phenol to about 1.00 part by weight of formaldehyde in the presence of a fixed alkali catalyst, heating the said phenol-formaldehyde mass without boiling the same at a low heat substantially under 100° C. for a period of about 2 to about 4 hours under non-reflux conditions to form a resinous mass, applying a vacuum to said resinous mass after the termination of said period whereby water is evaporated and the temperature of the resinous mass tends to fall, continuing heating said resinous mass substantially under 100° C. to counteract the tendency of the temperature to fall, adding lactic acid to neutralize the alkali catalyst, continuing the application of said low heat and vacuum, adding glycerine to said resinous mass, continuing the application of said vacuum and low heat until a sample of the mass when dropped into cold water congeals to a globule having just sufficient hardness to yield slightly when squeezed between the fingers, thereafter pouring said mass into molds, and subjecting the mass in said molds to a low heat at a temperature substantially under about 100° C. to harden said resinous mass.

13. The process of producing a low temperature phenol-formaldehyde resin which comprises reacting phenol and a substance yielding formaldehyde in the proportion of about 1.00 parts by weight of phenol to about 0.80 parts by weight of formaldehyde in the presence of a fixed alkali catalyst, heating the said phenol-formaldehyde mass without boiling the same at a low heat substantially under 100° C. under non-reflux conditions to form a resinous mass, applying a vacuum to said resinous mass after the termination of said period whereby water is evaporated and the temperature of the resinous mass tends to fall, continuing heating said resinous mass substantially under 100° C. to counteract the tendency of the temperature to fall, adding lactic acid to neutralize the alkali catalyst, continuing the application of said low heat and vacuum, adding glycerine to said resinous mass, continuing the application of said vacuum and low heat until a sample of the mass when dropped into cold water congeals to a globule having just sufficient hardness to yield slightly when squeezed between the fingers, thereafter pouring said mass into molds, and subjecting the mass in said molds to a low heat at a temperature substantially under about 100° C. to harden said resinous mass.

14. The process of producing a low temperature phenol-formaldehyde resin which comprises reacting a mass of phenol and a substance yielding formaldehyde in the presence of a fixed alkali catalyst, heating the said phenol-formaldehyde mass without boiling the same at low heat substantially under 100° C. for a period of about 2 to about 4 hours under non-reflux conditions, applying a vacuum to the said mass whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said heat and vacuum, adding glycerine to the mass prior to final heating, continuing the application of said heat and vacuum pouring the liquid resin into molds, and subjecting said molds to a low heat at a temperature substantially under 100° C. to harden the said resin.

15. The process of producing a low temperature phenol-formaldehyde resin which comprises reacting a mass of about 1.00 part by weight of a phenol and about 0.80 parts by weight of formaldehyde in the presence of a fixed alkali catalyst, heating the said phenol-formaldehyde mass without boiling the same at low heat substantially under 100° C. for a period of about 2 to about 4 hours under non-reflux conditions, applying a vacuum to the said mass whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said heat and vacuum, adding glycerine to the mass prior to final heating, continuing the application of said heat and vacuum, pouring the liquid resin into molds, and subjecting said molds to a low heat at a temperature substantially under 100° C. to harden the said resin.

16. The process of producing a low temperature phenol-formaldehyde resin which comprises reacting about 1.00 part by weight of U. S. P. phenol with about 2.0 parts of about a 40% to about 2.5 parts of about a 30% by weight of U. S. P. aqueous formaldehyde in the presence of a fixed alkali catalyst, heating said mass without boiling the same at a temperature of about 60° C. to about 80° C. for a period of about 2 to about 4 hours under non-reflux conditions to form a resinous mass, adding c. p. lactic acid to substantially neutralize said fixed alkali catalyst, applying a vacuum and said heat to effect the evaporation of water, the temperature of the mass tending to fall to a temperature of about 35° C. to about 40° C., adding about 0.15 to about 0.20 parts by weight of c. p. glycerine to said mass, continuing the application of heat to raise the temperature of said mass to a temperature of about 60° C. to about 80° C. and until a sample of the resinous mass when dropped into cold water congeals to a globule having just sufficient hardness to yield slightly when squeezed between the fingers, pouring the mass into molds, and subjecting the resinous mass in said molds to a low heat of a temperature of about 60° C. to about 82° C. up to about 200 hours to harden said resinous mass.

17. A solid low temperature phenol-formaldehyde synthetic resin made by reacting phenol and a substance yielding formaldehyde in the proportion of about 1.00 part by weight of phenol to about 0.80 part by weight of formaldehyde in the presence of a fixed alkali catalyst, heating the said phenol-formaldehyde mass at a low heat substantially under 100° C. for a period of about 2 to about 4 hours to form a resinous mass, applying a vacuum to said resinous mass whereby water is evaporated and the temperature of the resinous mass tends to fall, continuing heating said resinous mass substantially under 100° C. to counteract the tendency of the temperature to fall, adding lactic acid to substantially neutralize the alkali catalyst, continuing the application of said low heat and vacuum, adding glycerine to said resinous mass, continuing the application of said vacuum and said heat until a sample of the mass when dropped into cold water congeals to a globule having just sufficient hardness to yield slightly when squeezed between the fingers, thereafter pouring said mass into molds, and subjecting said molds to a low heat at a temperature substantially under about 100° C. for a period up to 200 hours to harden said resinous mass.

18. A solid low temperature synthetic resin made by reacting phenol with formaldehyde in the presence of a fixed alkali hydroxide, heating said mass without boiling the same at a temperature substantially under 100° C. under non-reflux conditions to form a resinous mass, applying a vacuum to effect the evaporation of water, the temperature of the mass tending to fall, continuing the application of heat to raise the temperature of said mass to a temperature substantially under 100° C., adding lactic acid to substantially neutralize said alkali catalyst, continuing the application of said heat substantially below 100° C. and said vacuum to effect dehydration of the resinous mass, adding glycerine to the mass during the aforesaid operations, then pouring the resinous mass into molds and subjecting said molds to heat at a temperature substantially below 100° C. to harden and solidify the said resinous mass.

19. A solid low temperature synthetic resin made by reacting phenol and a substance yielding formaldehyde in the proportion of about 1.00 part by weight of phenol to about 0.80 parts by weight of formaldehyde in the presence of a fixed alkali catalyst, heating the said phenol-formaldehyde mass without boiling the same at a low heat substantially under 100° C. under non-reflux conditions to form a resinous mass, applying a vacuum to said resinous mass whereby water is evaporated and the temperature of the resinous mass tends to fall, continuing heating said resinous mass substantially under 100° C. to counteract the tendency of the temperature to fall, adding c. p. lactic acid to substantially neutralize the alkali catalyst, continuing the application of said heat and said vacuum, adding glycerine to said resinous mass, continuing the application of said vacuum and said heat until a sample of the mass when dropped into cold water congeals to a globule having just sufficient hardness to yield slightly when squeezed between the fingers, thereafter pouring said mass into molds, and subjecting the mass in said molds to a low heat at a temperature substantially under about 100° C. to harden said resinous mass.

20. A solid low temperature synthetic resin made by reacting a mass of phenol and a substance yielding formaldehyde in the presence of a fixed alkali catalyst, heating the said phenol-formaldehyde mass without boiling the same at a low heat substantially under 100° C. for a period of about 2 to about 4 hours under non-reflux conditions, applying a vacuum to the said mass whereby water is evaporated and the temperature of mass tends to fall, continuing heating said mass substantially under 100° C. to counteract the tendency of temperature to fall, adding c. p. lactic acid to substantially neutralize said alkali catalyst, continuing the application of said heat and said vacuum, adding glycerine to the mass prior to final heating, continuing the application of said heat and said vacuum, pouring the liquid resin into molds, and subjecting said molds to a low heat at a temperature substantially under 100° C. to harden the said resin.

21. A solid low temperature synthetic resin made by reacting about 1.00 part by weight of U. S. P. phenol with about 2.0 parts of about a 40% to about 2.5 parts of about a 30% by weight of U. S. P. aqueous formaldehyde in the presence of a fixed alkali catalyst, heating said mass without boiling the same at a temperature of about 60° C. to about 80° C. for a period of about 2 to about 4 hours under non-reflux conditions to form a resinous mass adding c. p. lactic acid to substantially neutralize said alkali catalyst, applying a vacuum and said heat to effect the evaporation of water, the temperature of the mass tending to fall to a temperature of about 35° C. to about 40° C., adding about 0.15 to about 0.20 parts by weight of c. p. glycerine to said mass, continuing the application of heat to raise the temperature of said mass to a temperature of about 60° C. to about 80° C. and until a sample of the resinous mass when dropped into cold water congeals to a globule having just sufficient hardness to yield slightly when squeezed between the fingers, pouring the mass into molds, and subjecting the resinous mass in said molds to a low heat of a temperature of about 60° C. to about 82° C. up to about 200 hours to harden said resinous mass.

22. A solid low temperature phenol-formaldehyde synthetic resin produced by the process set forth in claim 11 and having the following properties:—

Specific gravity, approximately 1.250 to 1.380.

Tensile strength, approximately 6,000 to 10,000 lbs. per sq. in.

Compression strength, approximately 10,000 to 16,000 lbs. per sq. in.

23. A low temperature phenol-formaldehyde synthetic resin produced by the process set forth in claim 14 having a pH value of about 6.00 in its liquid state.

24. A solid low temperature phenol-formaldehyde synthetic resin produced by the process in claim 15, said synthetic resin being relatively non-brittle and being capable of producing a relatively long, practically unbroken ribbon or shaving when turned on a lathe.

25. A solid low temperature phenol-formaldehyde synthetic resin produced by the process set forth in claim 16, said synthetic resin being relatively tough, strong and elastic and being capable of bending quite readily when submerged in hot water in the form of a small rod.

26. The process of producing a low temperature phenol-formaldehyde resin which comprises reacting phenol with formaldehyde in the presence of a fixed alkali hydroxide to form a resinous mass, heating said mass without boiling the same at a temperature substantially under 100° C. under non-reflux conditions, applying a vacuum to effect the evaporation of water, the temperature of the mass tending to fall, continuing the application of heat to raise the temperature of said mass to a temperature substantially under 100° C., adding lactic acid to substantially neutralize said alkali catalyst, continuing the application of said heat substantially below 100° C. and said vacuum to effect dehydration of the resinous mass, adding glycerine to said resinous mass, continuing the application of said heat and said vacuum, pouring the resinous mass into molds and subjecting said molds to heat at a temperature substantially below 100° C. to harden and solidify the said resinous mass.

27. A solid low temperature phenol-formaldehyde synthetic resin made by reacting phenol and a substance yielding formaldehyde in the presence of a fixed alkali catalyst to form a resinous mass, heating the said phenol-formaldehyde mass at a low heat substantially under 100° C., applying a vacuum to said resinous mass whereby water is evaporated and the temperature of the resinous mass tends to fall, continuing heating said resinous mass substantially under 100° C. to counteract the tendency of the temperature to fall, adding lactic acid to substantially neutralize the alkali catalyst, continuing the application of said low heat and vacuum, adding glycerine to said resinous mass, continuing the application of said vacuum and said heat, pouring said resinous mass into molds, and subjecting said molds to a low heat at a temperature substantially under about 100° C.

In testimony whereof, I hereunto set my hand.

OSKAR PANTKE.